United States Patent [19]

Venetucci

[11] Patent Number: 5,467,612
[45] Date of Patent: Nov. 21, 1995

[54] FREEZING SYSTEM FOR FRANGIBLE FOOD PRODUCTS

[75] Inventor: Jim M. Venetucci, Forest Park, Ill.

[73] Assignee: Liquid Carbonic Corporation, Oak Brook, Ill.

[21] Appl. No.: 235,386

[22] Filed: Apr. 29, 1994

[51] Int. Cl.⁶ ................................................. F25D 17/02
[52] U.S. Cl. ................................................. 62/374; 62/63
[58] Field of Search .................................. 62/63, 374, 380

[56] References Cited

U.S. PATENT DOCUMENTS

| | | | |
|---|---|---|---|
| 993,321 | 5/1911 | Coddington | 62/374 |
| 1,907,649 | 5/1933 | Marx | 62/374 |
| 2,080,103 | 5/1937 | Zarotschenzeff | 62/375 |
| 2,974,497 | 3/1961 | Carpenter et al. | |
| 3,122,897 | 3/1964 | Overbye | |
| 3,187,514 | 6/1965 | Rendos | 62/375 |
| 3,253,420 | 5/1966 | De George | |
| 3,255,608 | 6/1966 | Macintosh | |
| 3,292,384 | 12/1966 | Rubin | |
| 3,298,188 | 4/1964 | Webster et al. | 62/63 |
| 3,376,710 | 4/1968 | Hirtensteiner | |
| 3,393,532 | 7/1968 | Khoylian | |
| 3,402,568 | 9/1968 | Kamin et al. | |
| 3,404,989 | 10/1968 | Hirtensteiner | |
| 3,436,927 | 4/1969 | Gruber | |
| 3,485,055 | 12/1969 | Webster et al. | |
| 3,507,128 | 4/1970 | Murphy et al. | |
| 3,553,973 | 1/1971 | Moran | |
| 3,613,386 | 10/1971 | Klee | |
| 3,664,149 | 5/1972 | Garland et al. | |
| 3,672,181 | 6/1972 | Tyree, Jr. | |
| 3,688,518 | 9/1972 | Goltsos | |
| 3,708,995 | 1/1973 | Berg | |
| 3,793,937 | 2/1974 | Lipoma | 62/374 |
| 3,815,377 | 6/1974 | Tyree, Jr. | |
| 3,841,109 | 10/1974 | Cann | |
| 3,844,133 | 10/1974 | Bierley et al. | |
| 3,871,185 | 3/1975 | Harper et al. | |
| 3,871,186 | 3/1975 | Wagner | |
| 3,871,190 | 3/1975 | Harper et al. | |
| 3,878,691 | 4/1975 | Asztalos | |
| 3,882,687 | 5/1975 | Asztalos et al. | |
| 3,898,863 | 8/1975 | Wagner | |
| 3,916,640 | 11/1975 | Rasovich | |
| 3,960,206 | 6/1976 | Baxter et al. | |
| 4,030,898 | 6/1977 | Morita | 62/375 |
| 4,086,783 | 5/1978 | Wagner et al. | |
| 4,086,784 | 5/1978 | Wagner | |

(List continued on next page.)

FOREIGN PATENT DOCUMENTS

| | | |
|---|---|---|
| 0332287A1 | 9/1989 | European Pat. Off. |
| 496675 | 7/1954 | Italy |
| 121803 | 3/1959 | U.S.S.R. |

OTHER PUBLICATIONS

"Cryo-Shield® Liquid Carbonic Food Freezing Systems $CO_2$," 12 Page Brochure, Liquid Carbonic, Chicago, Illinois, Form No. 6720, ©1981 Liquid Carbonic Corporation.
"Ultra-Freeze® can boost your profits," 4 page brochure with insert pp. 1–6, CARDOX® Division of Chemetron Corporation, Countryside, Illinois, Form No. B-1, ©1978 Chemetron Corporation.

*Primary Examiner*—Ronald C. Capossela
*Attorney, Agent, or Firm*—Fitch, Even, Tabin & Flannery

[57] ABSTRACT

According to the present invention, apparatus for freezing fragile food products is provided. The apparatus includes a first freezing section which includes a solid conveyor belt which is guided to provide an upper product receiving section and a lower section, which passes through a bath of cryogen so as to chill the surface of the belt. The first freezing section includes means to admit product onto the upper belt section and also includes means to move the product to an exit end of the upper belt section. A second freezing section is provided which is a spiral mechanical or cryogenic freezer. The first freezer has an entry end and an exit end. The entry end of the second freezing section is mated to the exit end of the first freezing section so as to receive product having a bottom frozen surface crust from the first freezing section.

7 Claims, 1 Drawing Sheet

U.S. PATENT DOCUMENTS

| | | |
|---|---|---|
| 4,127,008 | 11/1978 | Tyree, Jr. . |
| 4,171,625 | 11/1977 | Morgan et al. .......................... 62/380 |
| 4,186,566 | 2/1980 | AuYoung . |
| 4,195,490 | 4/1980 | Soecknick et al. . |
| 4,229,947 | 10/1980 | Klee . |
| 4,237,695 | 12/1980 | Oberpriller et al. . |
| 4,276,753 | 7/1981 | Sandberg et al. . |
| 4,333,318 | 6/1982 | Tyree, Jr. . |
| 4,350,027 | 9/1982 | Tyree, Jr. . |
| 4,399,658 | 8/1983 | Nielsen . |
| 4,403,479 | 9/1983 | Rasovich . |
| 4,475,351 | 10/1984 | Klee . |
| 4,481,782 | 11/1984 | Mukerjee . |
| 4,528,819 | 7/1985 | Klee . |
| 4,589,264 | 5/1986 | Åström . |
| 4,657,768 | 4/1987 | Nagoshi .................................. 426/524 |
| 4,739,623 | 4/1988 | Tyree, Jr. et al. . |
| 4,748,029 | 5/1988 | Alfred et al. . |
| 4,783,972 | 11/1988 | Tyree, Jr. et al. . |
| 4,852,358 | 8/1989 | Acharya et al. . |
| 4,856,285 | 8/1989 | Acharya et al. ......................... 62/332 |
| 4,858,445 | 8/1989 | Rasovich ................................. 62/332 |
| 4,866,946 | 9/1989 | Klee . |
| 4,881,379 | 11/1989 | Sakai . |
| 4,912,943 | 4/1990 | Hubert et al. . |
| 4,914,927 | 4/1990 | Miller et al. . |
| 5,018,438 | 5/1991 | Grandi . |
| 5,020,330 | 6/1991 | Rhoades et al. ......................... 62/63 |
| 5,205,135 | 4/1991 | Lang ........................................ 62/381 |
| 5,220,802 | 6/1993 | Kiczek et al. ............................ 62/63 |
| 5,220,803 | 6/1993 | Kiczek ..................................... 62/63 |
| 5,256,434 | 10/1993 | Conway .................................. 426/393 |

FREEZING SYSTEM FOR FRANGIBLE FOOD PRODUCTS

FIELD OF THE INVENTION

The present invention relates to a freezing system and apparatus for freezing food products. More particularly, the present invention is directed to a freezing system for freezing fragile food products, such as hamburgers and fish fillets.

BACKGROUND OF THE INVENTION

Mechanical and cryogenic spiral freezers are well known in the food industry. The spiral constructions of these freezers permits relatively long freezing surfaces to be contained in a relatively small area. Such freezers, however, include a straight entry section which undergoes a transition to a circular configuration within the freezer. At the transition point the conveyor belt usually undergoes two different changes at the same time. The inner section of the belt compresses (collapse's) while the outer part expands and the links pull apart. U.S. Pat. No. 5,141,099 describes an expand only belt. These conditions squeeze or pinch the bottom of the food item that is on the inside of the conveyor and also makes it stick in the opening of the conveyor belt which damages the food item and makes it difficult to release. In contrast, the outside conveyor expands and stretches or pulls the food item out of a round shape. Both conditions create an undesirable frozen shape which is difficult to stack and package. Retaining the round configuration and flat bottom of a meat patty is of prime importance to attain proper packaging as well as grill to be able to "sear" the surface during cooking.

Hybrid freezing systems have been proposed, such as that set forth in U.S. Pat. No. 5,220,803 to Kiczek. The hybrid freezing system of the Kiczek patent mates the outlet of an inversion-type cryogenic freezer to the inlet of a spiral-type mechanical freezer. Cryogen vaporizing in the immersion unit is directly injected into the mechanical refrigerator where the cryogen is in direct heat exchange with refrigerated air circulating inside the mechanical refrigerator.

As shown in FIG. 1 of the Kiczek patent, the product to be frozen is dropped through a port into the liquid cryogen and is then carried by a conveyor belt through the cryogen bath to the entrance of the mechanical freezer. During passage of the food product through the cryogen bath, a crust is formed on the product which minimizes or lowers the dehydration of the final frozen product. It would not be practical to utilize this method for fragile food products such as hamburgers, which need to be placed in a certain and fixed relationship to each other on the conveyor belt.

Accordingly, it is a principle object of the present invention to provide a freezing system to impart a frozen crust on fragile food products, such as hamburgers, prior to introducing the food product into a mechanical or cryogenic spiral freezer.

SUMMARY OF THE INVENTION

Figure 1:
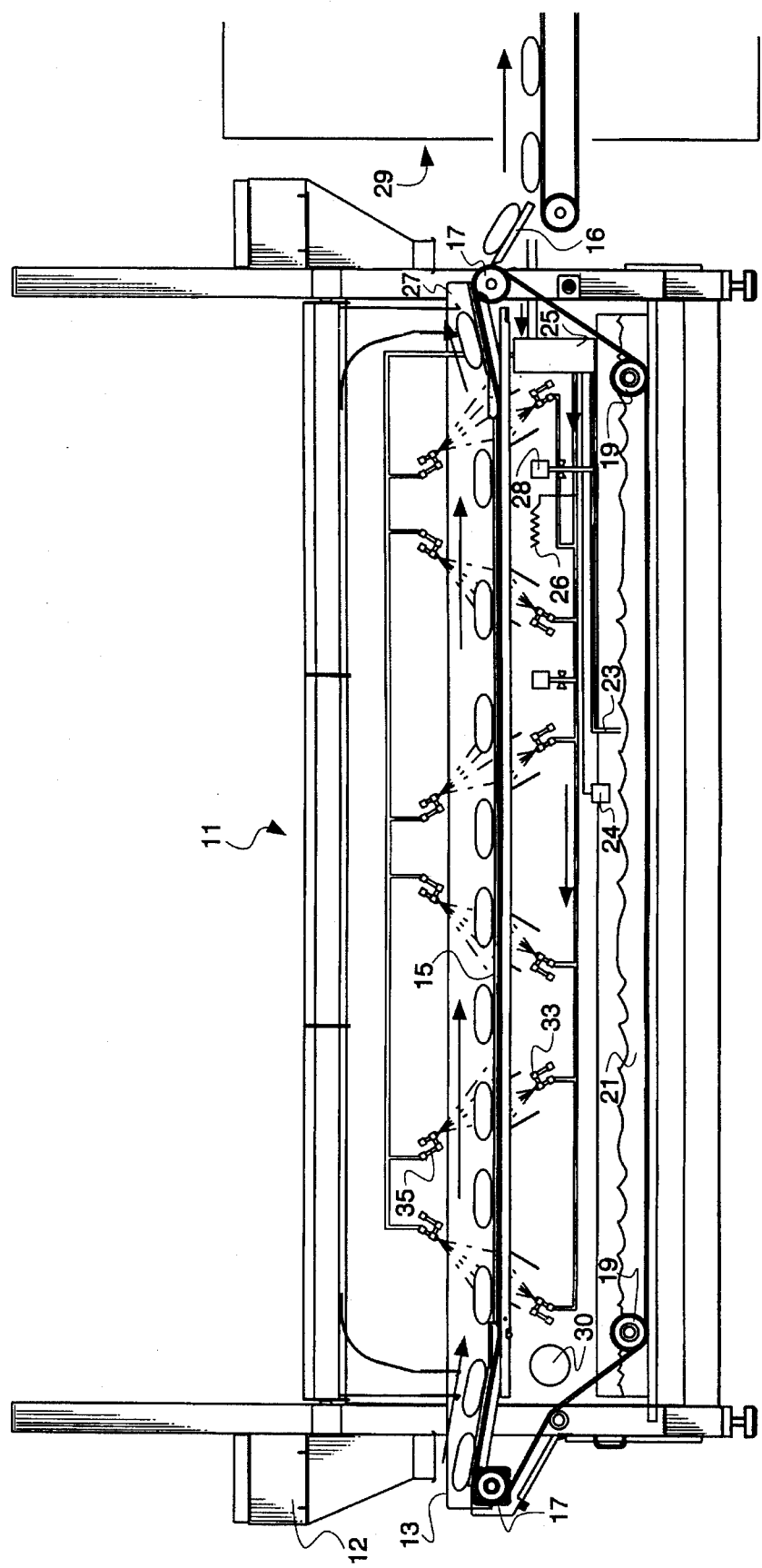
FIG. 1 is a schematic representation of apparatus according to the present invention.

According to the present invention, apparatus for freezing fragile food products is provided. The apparatus includes a first freezing section which includes a solid conveyor belt which is guided to provide an upper product receiving section and a lower section, which passes through a bath of cryogen so as to chill the surface of the belt. The first freezing section includes means to admit product onto the upper belt section and also includes means to move the product to an exit end of the upper belt section. A second freezing section is provided which is a spiral mechanical or cryogenic freezer. The first freezer has an entry end and an exit end. The entry end of the second freezing section is mated to the exit end of the first freezing section so as to receive product having a bottom frozen surface crust from the first freezing section.

DETAILED DESCRIPTION OF THE INVENTION

Referring to FIG. 1, the apparatus of the present invention comprises a first freezer section 11. Freezer 11 has an insulated housing 12 and a product inlet port 13 in the housing for placing product to be frozen onto conveyor belt 15. Conveyor belt 15 is driven around rollers 17 and tension rollers 19, so as to pass the conveyor belt 15 through a cryogen bath 21. The cryogen bath 21 is supplied by cryogen inlet 23 from cryogen manifold 25. The level of cryogen is controlled by liquid level sensor 24, temperature sensor 26 and control valve 28. Vaporized cryogen gas is exhausted through cryogen outlet 30. The exhausted cryogen gas may be routed through the second spiral freezer 29 to supply part of the freezing load for that freezer.

Conveyor belt 15 is made from a solid material, such as stainless steel, to provide a smooth solid surface or may be made from individual metal or plastic plates interlocking to form a smooth, solid surface. As this conveyor belt is drawn through the cryogen bath, the belt becomes extremely cold. Food products such as meat patties are placed on the cold belt and are transferred through product outlet port 27 into a second cryogen or mechanical spiral-type freezer 29 by means of conveyor belt 31. The spiral-type freezer 29 can be any of the commercially known spiral-type freezers, such as that described in U.S. Pat. No. 5,020,330 to Rhoades, et al., the teachings of which are incorporated herein by reference.

While the conveyor belt 15 may be made of a solid material, such as stainless steel, it is preferably made from individual metal or plastic plates interlocking to form a smooth, solid surface. A stainless steel conveyor belt would be relatively thin and heat transfer to freeze the surface of a food product would take place very rapidly. This might result in product sticking to the surface. The rollers 17 are the driving rollers for conveyor belt 15. For a stainless steel belt, the driving engagement is friction between the surface of the rollers 17 and the surface of conveyor belt 15. This requires large diameter rollers. The use of interlocking metal or plastic plates permits the use of positive engagement between rollers 17 and conveyor belt 15 and allows the use of smaller diameter rollers 17.

As the conveyor belt is drawn through the cryogen the plates become extremely cold. A food product, such as meat patties, are placed on the cold plate and the surface of the product is frozen to provide a crust during contact with the conveyor belt surface. This makes the food product rigid enough to be transferred into the spiral-type freezer. A scraper bar 16 is mounted at the exit end of conveyor belt 15 to assist in removing product from the conveyor belt. The scraper bar has a very thin knife edge. The product slides or moves enough to take the transition turn from the straight portion of the internal spiral moving conveyor belt to the circular portion of the spiral conveyor belt. This eliminates any damage to the food product. The food product can also be placed closer together in the spiral-type freezer so as to increase production and efficiency.

As shown in FIG. 1, a cryogen can also be sprayed by nozzles 33 onto the bottom surface of the conveyor belt to provide additional cooling for the conveyor belt. Also, as shown in FIG. 1, the top surface of the food product can be crust frozen by spraying a cryogen onto the top surface of the product from nozzles 35 as it is being transferred along the length of conveyor belt 15.

The use of a solid, chilled conveyor belt in accordance with the present invention has numerous advantages over the prior art wherein a surface crust is frozen on the product by moving the product through a bath of cryogenic fluid. The chilled conveyor belt of the present invention permits exact placement of the food product in close proximity. Also, the use of a liquid cryogen bath to freeze the product promotes stress cracking in many food products, such as meat patties, filled pasta and fish fillets.

What is claimed is:

1. Apparatus for freezing frangible foodstuffs comprising:
   (a) a first freezing section which includes a solid conveyor belt which is guided by roller means to provide an upper product receiving section and a lower immersed section with the lower immersed section passing through a bath of cryogen to chill the surface of said belt and the upper section extending above the cryogen bath, said first freezing section including means to admit product onto said upper belt section and means to move said product to an exit end of said upper belt section prior to said product reaching said lower immersed section; and
   (b) a second freezing section which is a spiral mechanical or cryogenic freezer having an entry end and an exit end, said entry end of said freezing section being mated to said exit end of said first freezing section so as to receive product form said first freezing section which has a bottom frozen crust to cause product to traverse the spiral freezer substantially undamaged at the bottom surface thereof from the entry end to the exit end of the spiral freezer.

2. Apparatus in accordance with claim 1 wherein said solid conveyor belt of said first freezing section is provided by a continuous sheet of stainless steel.

3. Apparatus in accordance with claim 1 wherein said solid conveyor belt of said first freezing section is provided by a plurality of interlocking metal or plastic plates.

4. Apparatus in accordance with claim 1 wherein spray nozzles are provided for spraying cryogen onto the bottom surface of said conveyor belt upper section of said first freezing section as a food product is being transported on the conveyor belt upper section.

5. Apparatus in accordance with claim 1 wherein spray nozzles are provided for spraying cryogen onto the top surface of food products being transported on the conveyor belt upper section of said first freezing section.

6. An apparatus for freezing a food product, the apparatus comprising:
   a receptacle having a liquid refrigerant therein;
   a conveyor having upper and lower portions including a top surface thereof;
   means for driving a section of the top surface alternately between a food product receiving position and a conveyor cooling position wherein in the food product receiving position the top surface section is facing in a first direction to support the bottom surface of food products thereon and in the conveyor cooling position the top surface section is facing oppositely to the first direction immersed in the liquid refrigerant to cause the food product bottom surface on the top surface section to freeze with the top surface section in the food product receiving position.

7. The apparatus of claim 6 wherein said driving means includes arcuate portions at either end of the upper and lower portions joining the upper and lower portions and rollers engaging the arcuate portions and driving the conveyor at the arcuate portions to move the top surface section alternately between the upper, arcuate and lower portions as the rollers drive the conveyor.

* * * * *